(12) United States Patent
Rice

(10) Patent No.: US 12,119,632 B2
(45) Date of Patent: Oct. 15, 2024

(54) ELECTRICAL BOX WITH INTERNAL CONDUCTIVE ELEMENTS

(71) Applicant: Daniel Rice, Lake Arrowhead, CA (US)

(72) Inventor: Daniel Rice, Lake Arrowhead, CA (US)

( * ) Notice: Subject to any disclaimer, the term of this patent is extended or adjusted under 35 U.S.C. 154(b) by 0 days.

(21) Appl. No.: 18/037,048

(22) PCT Filed: Nov. 17, 2021

(86) PCT No.: PCT/US2021/059796
§ 371 (c)(1),
(2) Date: May 15, 2023

(87) PCT Pub. No.: WO2022/109074
PCT Pub. Date: May 27, 2022

(65) Prior Publication Data
US 2024/0106215 A1 Mar. 28, 2024

Related U.S. Application Data

(60) Provisional application No. 63/149,559, filed on Feb. 15, 2021, provisional application No. 63/115,085, filed on Nov. 18, 2020.

(51) Int. Cl.
*H02G 3/00* (2006.01)
*H02G 3/08* (2006.01)
*H02G 3/16* (2006.01)

(52) U.S. Cl.
CPC .............. *H02G 3/16* (2013.01); *H02G 3/083* (2013.01)

(58) Field of Classification Search
CPC ................................ H02G 3/16; H02G 3/083
See application file for complete search history.

(56) References Cited

U.S. PATENT DOCUMENTS 2,959,633 A * 11/1960 Palmer .................. H02G 3/085
174/53
3,510,822 A 5/1970 Edmund
(Continued)

*Primary Examiner* — Pete T Lee
(74) *Attorney, Agent, or Firm* — Kenneth Avila

(57) ABSTRACT

The present invention is an electrical junction box assembly that may receive a variety of electrical devices such as switches, sockets, dimmers, and such. The junction box assembly includes an outer casing, wherein the wires of incoming and outgoing electrical cables are retained within the outer casing at a set orientation and position. The assembly further comprises an insert that is positionable within the outer casing. The insert contains a plurality of conductive elements arranged as panels. The conductive panels are insulated from one another and have a plurality of ports present on both sides, or that pass through, that allow wires to make contact with a conductive panel. The ports on the side proximal to the wires of the incoming and outgoing electrical cables provide a means to establish an electrical connection between the wiring of these cables with a particular conductive panel. The ports on the side proximal to an electrical device provide a means to establish an electrical connection between the electrical device with a particular conductive panel. Each of the plurality of ports contains a mechanism to ensure an electrical connection between the conductive panel and whatever wiring has been inserted into the port as well as to secure the wiring within the port to resist accidental removal of the wiring.

16 Claims, 9 Drawing Sheets

(56) References Cited

U.S. PATENT DOCUMENTS

| | | | |
|---|---|---|---|
| 3,926,330 A | | 12/1975 | Deming et al. |
| 5,399,806 A | | 3/1995 | Olson |
| 5,471,012 A | * | 11/1995 | Opel .................. H02G 3/16 |
| | | | 174/53 |
| 5,659,151 A | | 8/1997 | Dale |
| 5,735,710 A | | 4/1998 | Blaauboer et al. |
| 6,342,675 B1 | | 1/2002 | DeBartolo, Jr. et al. |
| 6,558,190 B1 | * | 5/2003 | Pierson, Jr. ............ H01R 9/226 |
| | | | 439/535 |
| 6,617,511 B2 | | 9/2003 | Schultz et al. |
| 6,945,815 B1 | | 9/2005 | Mullally |
| 7,104,836 B1 | | 9/2006 | Gorman |
| 7,265,291 B1 | | 9/2007 | Gorman |
| 7,294,017 B2 | | 11/2007 | Scott |
| 7,569,771 B2 | | 8/2009 | Nicholson |
| 7,767,905 B2 | | 8/2010 | Meyer |
| 8,287,305 B2 | * | 10/2012 | Sil ........................ H01R 13/443 |
| | | | 439/535 |
| 9,368,948 B2 | | 6/2016 | Ruggiero |
| 9,437,978 B2 | * | 9/2016 | Green .................. H01R 13/652 |
| 9,793,697 B1 | * | 10/2017 | Colao .................. H01R 25/006 |
| 9,960,580 B1 | | 5/2018 | Ruggiero |
| 10,193,318 B1 | | 1/2019 | Hitchman |
| 10,749,321 B1 | | 8/2020 | Ruggiero |
| 10,777,984 B1 | | 9/2020 | Elbert |
| 2002/0164898 A1 | | 11/2002 | Nelson |
| 2012/0094511 A1 | | 4/2012 | Sil |
| 2015/0000972 A1 | | 1/2015 | Mayer |
| 2016/0233605 A1 | * | 8/2016 | Hernandez Ramirez .................... |
| | | | H02G 3/00 |
| 2016/0329669 A1 | * | 11/2016 | Hestrin ................ H01R 25/164 |

\* cited by examiner

ELECTRICAL BOX WITH INTERNAL CONDUCTIVE ELEMENTS

CROSS-REFERENCE TO RELATED APPLICATIONS

The present application discloses information common with and claims priority to a provisional application entitled "Electrical box with internal conductive elements", filed Nov. 18, 2020, and assigned Ser. No. 63/115,085, and to a provisional application entitled "Electrical box with internal conductive elements", filed Feb. 15, 2021, and assigned Ser. No. 63/149,559, which applications are incorporated herein by reference and describe an invention made by the present inventor.

BACKGROUND OF THE INVENTION

1. Field of the Invention

The present invention relates to electrical boxes used in domestic or commercial electrical wiring projects. More particularly, the present invention relates to electrical boxes that contain conductive elements therein that interconnect incoming current bearing wires with an electrical device such as a switch, socket, dimmer, and such, to remove the need to couple individual wire strands within the electrical box with tape or wire nuts.

2. Description of the Related Art

The present invention relates generally to electric circuit components and more particularly to switches, receptacles, and other junction components which may be quickly, simply, and safely installed. As a result, the time required by one or more electricians in a construction project to wire and install various electrical devices defined as switches, sockets, dimmers, and such, are reduced. This in turn lowers the overall cost of the construction project.

Building construction can be expensive and time-consuming because buildings are often large and because a multitude of complex tasks must be completed. Moreover, these tasks must be performed in the proper order as otherwise defects that are discovered are more difficult to resolve or previously performed work that was completed in a satisfactory manner will have to be torn down so that a previously required task may be completed.

One of the more expensive aspects of constructing a home or a commercial building are those tasks related to electrical circuitry installation. These tasks must be performed in a set of tasks that are separated by other tasks. Therefore, an electrician must complete a first task, leave the worksite for other tasks to be completed, return and complete a second task, leave the worksite again for other tasks to be completed, and so on until all of the electrical work is completed. Thus not only must an electrician be a highly skilled worker and well-compensated for the work they perform, but also must revisit the worksite multiple times. If those tasks that are to be completed between the tasks performed by the electrician are delayed, the electrician may not be able to return to the worksite as planned further delaying the completion of the construction project.

Typically, an electrician positions electrical boxes, per a plan, on the exposed frame of the building. These electrical boxes will eventually hold electrical devices as defined above. Next, the electrician routes wires from the building's circuit breaker box to individual electrical boxes and between the individual electrical boxes themselves. Once, the individual wires are positioned within the electrical boxes, the ends are stripped of their insulating covering and a wire nut is attached to the exposed end. Once the wiring has been distributed to each electrical box, the electrician must wait until a government official inspects and passes the work performed by the electrician and the drywall has been installed. Openings are cut into the drywall to give the electrician access to the electrical boxes and the wiring previously installed. At this point, the electrician may return to the worksite and install electrical devices, as defined above, to each electrical box by adding additional wiring to connect the electrical device to the previously installed wiring. Finally, the drywall is painted and cover plates are installed over the electrical devices. Government officials again return to inspect the electrical work performed by the electrician and upon a successful inspection, the work of the electrician is completed.

As one may see, there are several problems with this typical method of installing electrical boxes and their associated electrical devices. As previously mentioned, the electrician must leave the worksite only to return when intervening tasks are completed. This creates opportunities for delays in the completion of the construction project. Also previously mentioned, electricians are highly skilled workers and therefore expensive.

Other problems involve the stripping of the insulating material at the end of the wires positioned within the electrical boxes. If the stripping is improperly performed, the wire may be weakened where the insulating material is stripped and may break when the various electrical devices are squeezed into the electrical boxes. Additionally, the electrician may not observe those portions of the wiring where an excess of insulating material is stripped from the end of the wire, exposing the conductive leads of the wiring. Thus improper stripping of the wiring within an electrical box may cause a short in a circuit or the circuit to become opened leading to failures in the electrical circuits.

In addition, the electrical boxes are nominal in size and must hold not only the electrical devices but also a number of wires both coming into the electrical box and going out to the next electrical box in the circuit. This problem is compounded when the circuitry is more complex. As the number of wires increases, so does the opportunity for errors by the electrician or for the problems mentioned earlier when the electrician squeezes the electrical device into the electrical box.

What is needed is an electrical box, that by means of its design, will reduce the amount of wiring that exists within the electrical box, eliminate the need for wire nuts to connect the wiring of the electrical device to the wiring within the electrical box, is simple to use and install, and may use existing electrical devices while at the same time is adaptable to novel and new electrical devices.

BRIEF SUMMARY OF THE INVENTION

The present invention is an electrical box assembly that may receive any one of a variety of electrical devices as defined above. The electrical box assembly includes an outer casing, wherein the wires of incoming and outgoing electrical cables are retained within the outer casing at a set orientation and position. The assembly further comprises an insert that is positionable within the outer casing. The insert contains a plurality of conductive elements arranged as panels. The conductive panels are insulated from one another and have a plurality of ports present on both sides, or that pass through, that allow wires to make contact with a conductive panel. The ports on the side proximal to the wires of the incoming and outgoing electrical cables provide a means to establish an electrical connection between the wiring of these cables with a particular conductive panel. The ports on the side proximal to an electrical device provide a means to establish an electrical connection between the electrical device with a particular conductive panel. Each of the plurality of ports contains a mechanism to ensure an electrical connection between the conductive panel and whatever wiring has been inserted into the port as well as to secure the wiring within the port to resist accidental removal of the wiring.

Further areas of applicability of the present invention will become apparent from the detailed description provided hereinafter. It should be understood that the detailed description and specific examples, while indicating the preferred embodiment of the invention, are intended for purposes of illustration only and are not intended to limit the scope of the invention.

Neither this summary nor the following detailed description defines or limits the invention. The invention is defined by the claims.

BRIEF DESCRIPTION OF DRAWINGS

The present invention will become more fully understood from the detailed description and accompanying drawings, wherein.

DETAILED DESCRIPTION OF THE INVENTION

The following description of the preferred embodiment(s) is merely exemplary in nature and is in no way intended to limit the invention, its application, or its uses.

The present invention is an electrical box assembly that can be used with an electrical device, as defined above, without the need to use wire-nuts to electrically connect the wiring from the electrical device to the wiring found in the electrical cable that is part of a powered electrical circuit. Structurally, the electrical box assembly is similar to many existing electrical box assemblies used in the construction of commercial or residential buildings in that (i) openings are provided to receive electrical cabling bringing power to the electrical box assembly or to send power to the next electrical box assembly in the circuit, (ii) means to attach the electrical box assembly to the building's structural support, and (iii) an electrical device may be received and attached to the electrical box. The key difference between the electrical box assembly of the present invention and electrical boxes of the prior art is that an insert is provided having multiple connection points, referred to as ports, the insert allowing for electrical connections to be established between the electrical device and the electrical cabling entering and exiting the electrical box without the use of wire-nuts, soldering, taping, or other such means.

Figure 1A:
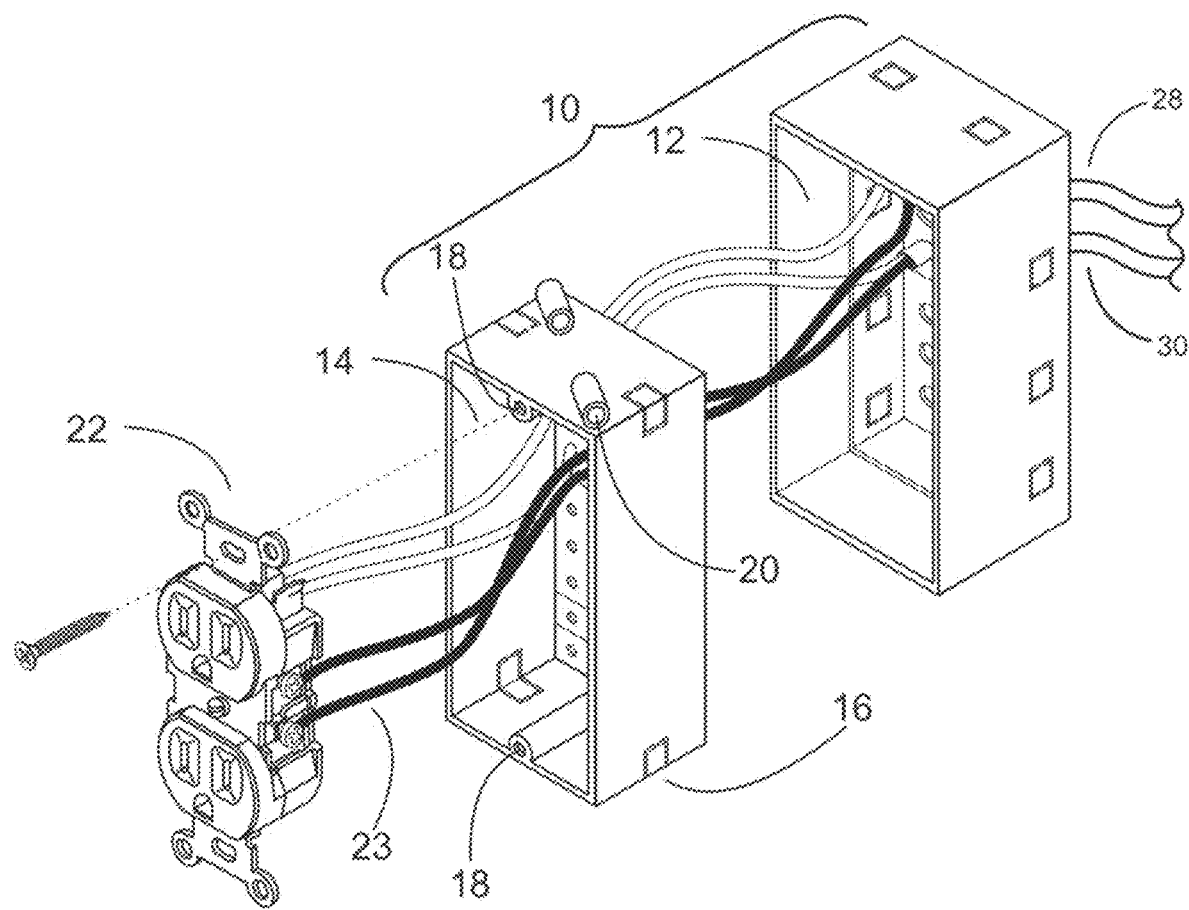
FIG. 1A shows an exploded view of the first embodiment of the electrical box assembly and an electrical device as defined above.
Figure 2:
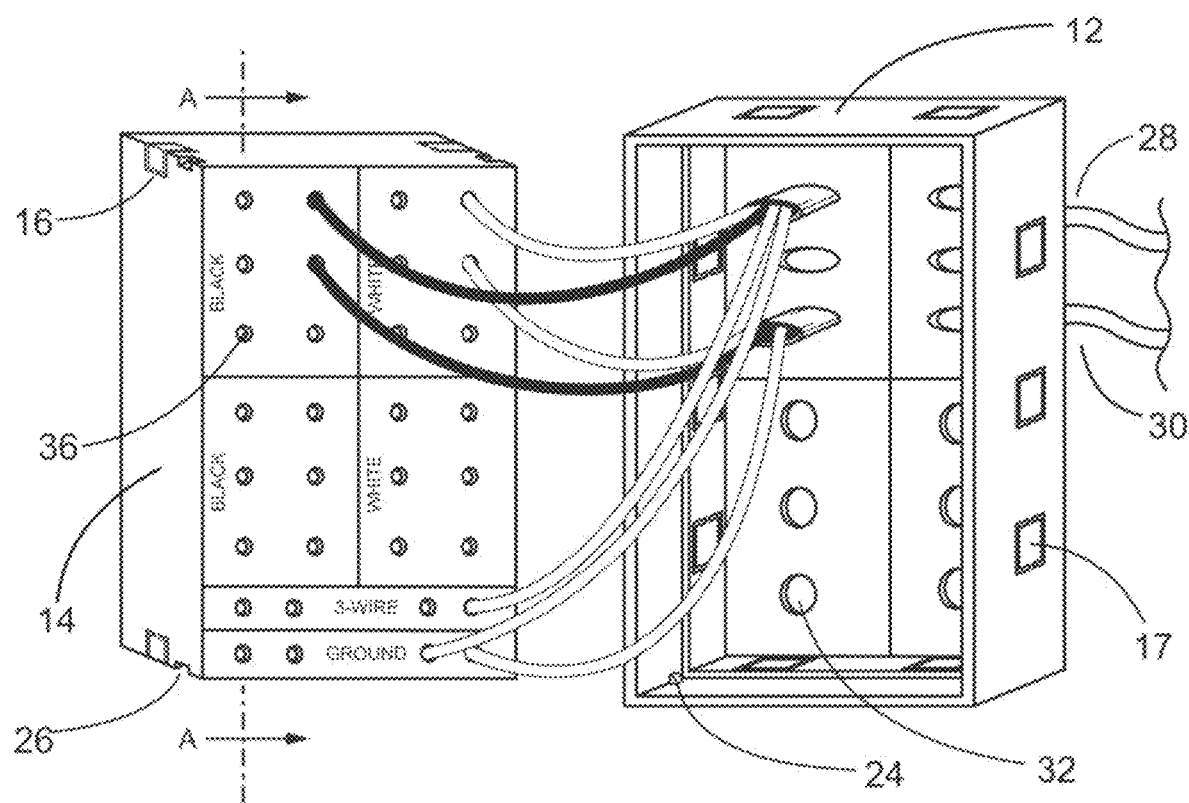
FIG. 2 shows a view of the electrical box structure with incoming and outgoing electrical cables inserted therethrough and individual wires connected to multiple ports in the insert.

Referring now to FIG. 1A, the reader is presented with an exploded view of the first embodiment of electrical box assembly 10 along with electrical device 22 which in FIG. 1A is an outlet. Electrical box assembly 10 consists of outer casing 12 and insert 14. Outer casing 12 is rectangular and enclosed along its back and side planes. There is no front plane so as to expose the hollow interior of outer casing 12. The back of outer casing 12 is configured with one or more openings 32 as shown in FIG. 1A and FIG. 2. Openings 32 may differ so as to accommodate varying cable types. It will be understood that the number and orientations of openings 32 and their configurations are merely exemplary and other numbers, orientations, and configurations may be used. For example, openings 32 may be circular or square. In addition, openings 32 may be similar to casing punch-out access plates 17 so that only a subset of openings 32 need to be opened. Casing punch-out access plates 17 allows the user to insert into outer casing 12 a wire cable, similar to incoming wire cable 28 or outgoing wire cable 30, if it is not possible to insert the wire cable through the back of outer casing 12. It will be understood to someone with ordinary skill in the art that the arrangement of casing punch-out access plates 17 may vary in regards to position, size, orientation, number, and method of construction from what is shown. Insert 14 is structurally similar to outer casing 12 in that it also is rectangular and enclosed along its back and side planes. There is no front plane so as to expose the hollow interior of insert 14. Insert 14 is sized along each dimension so as to be slightly smaller than outer casing 12 so that insert 14 may be partially inserted into outer casing 12. Insert 14 may also be fabricated with one or more insert punch-out access plates 16 of which four are visible in FIG. 1A. Insert punch-out access plates 16 are shown being fabricated on insert 14 via a small plastic tab that may be easily broken by the application of force or the use of a box cutter knife. It is understood that insert punch-out access plates 16 may also be formed by other means during fabrication. The purpose of insert punch-out access plates 16 is to provide the user of electrical box assembly 10 a means of connecting incoming wire cable 28 or outgoing wire cable 30 to electrical device 22 without using one of the many ports 36 found on the back plane of insert 14. It will be understood that the number and orientations of insert punch-out access plates 16 and their configurations are merely exemplary and other numbers, orientations, and configurations may be used. Also, it will be understood to one with ordinary skill in the art that many possible means may be considered to secure a wire to a particular port 36. Insert 14 also comprises a retaining clip 20 to mount insert 14 to a framing member of the commercial or residential building. Typically, insert 14 is secured to a framing member by driving a nail through retaining clip 20 and into the framing member. Outer casing 12 also may include retaining clip 20 to mount outer casing 12 to a framing member of the commercial or residential building. The framing member is not shown in FIG. 1A. Finally, insert 14 is also provided with mounting points 18, one mounting point 18 at the top of the front of insert 14, and a second mounting point 18 at the bottom of the front of insert 14. Electrical device 22 may be releasably attached to insert 14 by means of screws 25. Electrical device 22 may be electrically connected to incoming wire cable 28 or outgoing wire cable 30 by introducing incoming wire cable 28 or outgoing wire cable 30 through the back of outer casing 12 and appropriately attaching one of the wires found in incoming wire cable 28 or outgoing wire cable 30 to a port 36 found on the back of the back panel of insert 14 and then appropriately attaching device wires 23 to a port 36 found on the front of the back panel of insert 14. Other attributes and features of electrical box assembly 10 will be disclosed in the following figures.

Figure 1B:
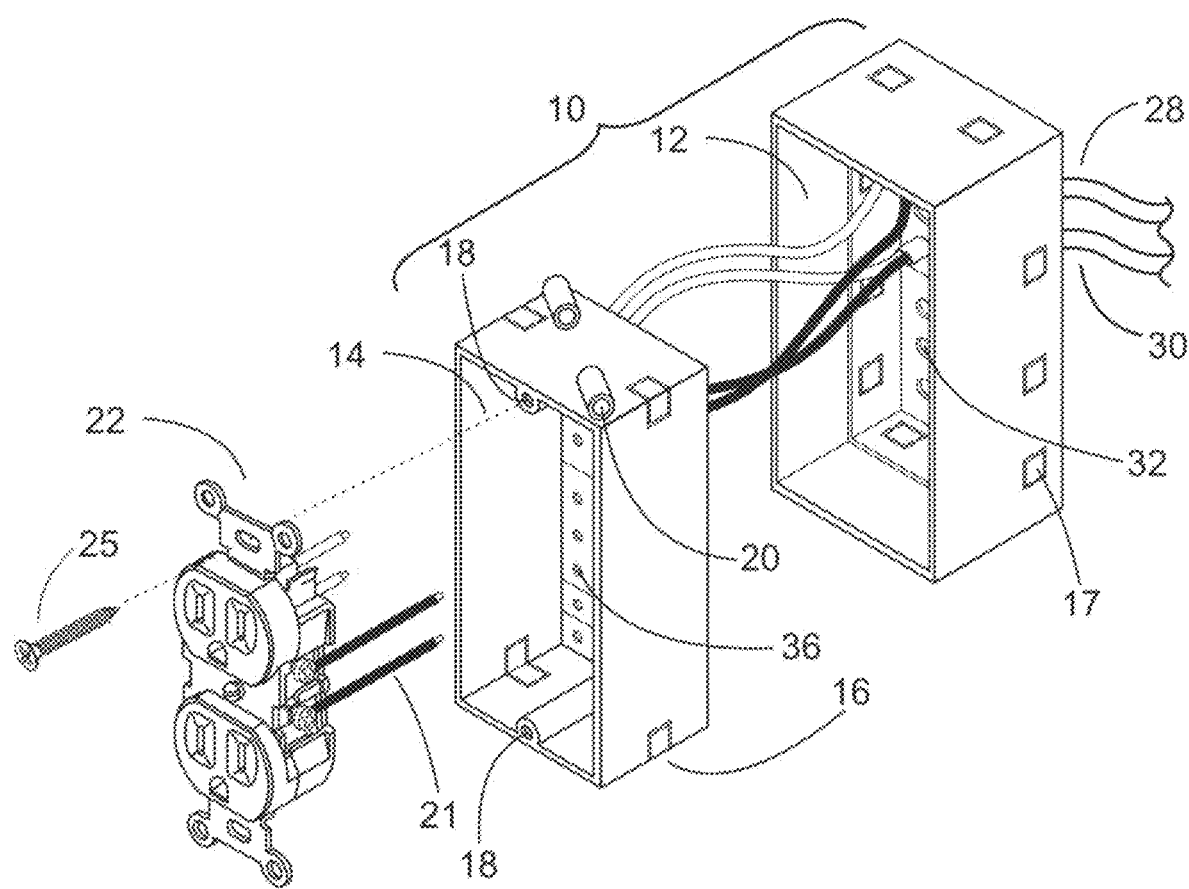
FIG. 1B shows an exploded view of the second embodiment of the electrical box assembly and an electrical device.

Referring now to FIG. 1B, the reader is presented with an exploded view of the second embodiment of electrical box assembly 10 along with electrical device 22 which in FIG. 1B is an outlet. Electrical box assembly 10 consists of outer casing 12 and insert 14. Outer casing 12 is rectangular and enclosed along its back and side planes. There is no front plane so as to expose the hollow interior of outer casing 12. The back of outer casing 12 is configured with one or more openings 32 as shown in FIG. 1B and FIG. 2. Openings 32 may differ so as to accommodate varying cable types. It will be understood that the number and orientations of openings 32 and their configurations are merely exemplary and other numbers, orientations, and configurations may be used. For example, openings 32 may be circular or square. In addition, openings 32 may be similar to casing punch-out access plates 17 so that only a subset of openings 32 need to be opened. Casing punch-out access plates 17 allows the user to insert into outer casing 12 a wire cable, similar to incoming wire cable 28 or outgoing wire cable 30, if it is not possible to insert the wire cable through the back of outer casing 12. It will be understood to someone with ordinary skill in the art that the arrangement of casing punch-out access plates 17 may vary in regards to position, size, orientation, number, and method of construction from what is shown. Insert 14 is structurally similar to outer casing 12 in that it also is rectangular and enclosed along its back and side planes. There is no front plane so as to expose the hollow interior of insert 14. Insert 14 is sized along each dimension so as to be slightly smaller than outer casing 12 so that insert 14 may be partially inserted into outer casing 12. Insert 14 may also be fabricated with one or more insert punch-out access plates 16 of which four are visible in FIG. 1B. Insert punch-out access plates 16 are shown being fabricated on insert 14 via a small plastic tab that may be easily broken by the application of force or the use of a box cutter knife. It is understood that insert punch-out access plates 16 may also be formed by other means during fabrication. The purpose of insert punch-out access plates 16 is to provide the user of electrical box assembly 10 a means of connecting incoming wire cable 28 or outgoing wire cable 30 to electrical device 22 without using one of the many ports 36 found on the back plane of insert 14. It will be understood that the number and orientations of insert punch-out access plates 16 and their configurations are merely exemplary and other numbers, orientations, and configurations may be used. Also, it will be understood to one with ordinary skill in the art that many possible means may be considered to secure a wire to a particular port 36. Insert 14 also comprises a retaining clip 20 to mount insert 14 to a framing member of the commercial or residential building. Typically, insert 14 is secured to a framing member by driving a nail through retaining clip 20 and into the framing member. Outer casing 12 also may include retaining clip 20 to mount outer casing 12 to a framing member of the commercial or residential building. The framing member is not shown in FIG. 1B. Finally, insert 14 is also provided with mounting points 18, one mounting point 18 at the top of the front of insert 14, and a second mounting point 18 at the bottom of the front of insert 14. Electrical device 22 may be releasably attached to insert 14 by means of screws 25. Electrical device 22 may be electrically connected to incoming wire cable 28 or outgoing wire cable 30 by introducing incoming wire cable 28 or outgoing wire cable 30 through the back of outer casing 12 and appropriately attaching one of the wires found in incoming wire cable 28 or outgoing wire cable 30 to a port 36 found on the back of the back panel of insert 14 and then appropriately attaching rods 21 to a port 36 found on the front of the back panel of insert 14. Rods 21 may be attached to and removed from electrical device 22 by machine screws, or other means that are known in the art, so that existing electrical fixtures 22 may be used with electrical box assembly 10. Additionally, rods 21 are aligned with ports 36 so that electrical device 22 may be simply embedded into insert 14 without requiring the installer to manually insert device wiring 23 into port 36 as shown in FIG. 1A. Other attributes and features of electrical box assembly 10 will be disclosed in the following figures.

Figure 1C:
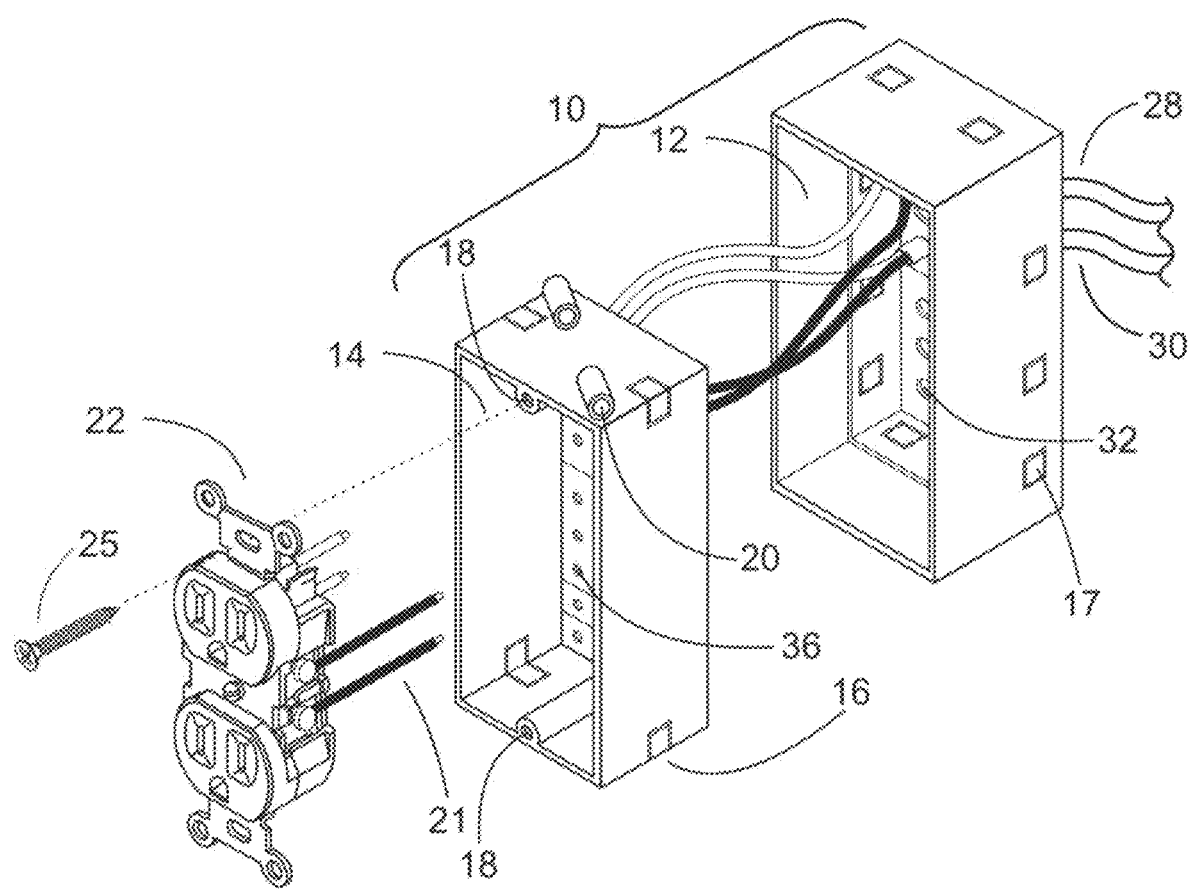
FIG. 1C shows an exploded view of the third embodiment of the electrical box assembly and an electrical device.

Referring now to FIG. 1C, the reader is presented with an exploded view of the third, embodiment of electrical box assembly 10 along with electrical device 22 which in FIG. 1C is an outlet. Electrical box assembly 10 consists of outer casing 12 and insert 14. Outer casing 12 is rectangular and enclosed along its back and side planes. There is no front plane so as to expose the hollow interior of outer casing 12. The back of outer casing 12 is configured with one or more openings 32 as shown in FIG. 1C and FIG. 2. Openings 32 may differ so as to accommodate varying cable types. It will be understood that the number and orientations of openings 32 and their configurations are merely exemplary and other numbers, orientations, and configurations may be used. For example, openings 32 may be circular or square. In addition, openings 32 may be similar to casing punch-out access plates 17 so that only a subset of openings 32 need to be opened. Casing punch-out access plates 17 allows the user to insert into outer casing 12 a wire cable, similar to incoming wire cable 28 or outgoing wire cable 30, if it is not possible to insert the wire cable through the back of outer casing 12. It will be understood to someone with ordinary skill in the art that the arrangement of casing punch-out access plates 17 may vary in regards to position, size, orientation, number, and method of construction from what is shown. Insert 14 is structurally similar to outer casing 12 in that it also is rectangular and enclosed along its back and side planes. There is no front plane so as to expose the hollow interior of insert 14. Insert 14 is sized along each dimension so as to be slightly smaller than outer casing 12 so that insert 14 may be partially inserted into outer casing 12. Insert 14 may also be fabricated with one or more insert punch-out access plates 16 of which four are visible in FIG. 1C. Insert punch-out access plates 16 are shown being fabricated on insert 14 via a small plastic tab that may be easily broken by the application of force or the use of a box cutter knife. It is understood that insert punch-out access plates 16 may also be formed by other means during fabrication. The purpose of insert punch-out access plates 16 is to provide the user of electrical box assembly 10 a means of connecting incoming wire cable 28 or outgoing wire cable 30 to electrical device 22 without using one of the many ports 36 found on the back plane of insert 14. It will be understood that the number and orientations of insert punch-out access plates 16 and their configurations are merely exemplary and other numbers, orientations, and configurations may be used. Also, it will be understood to one with ordinary skill in the art that many possible means may be considered to secure a wire to a particular port 36. Insert 14 also comprises a retaining clip 20 to mount insert 14 to a framing member of the commercial or residential building. Typically, insert 14 is secured to a framing member by driving a nail through retaining clip 20 and into the framing member. Outer casing 12 also may include retaining clip 20 to mount outer casing 12 to a framing member of the commercial or residential building. The framing member is not shown in FIG. 1C. Finally, insert 14 is also provided with mounting points 18, one mounting point 18 at the top of the front of insert 14, and a second mounting point 18 at the bottom of the front of insert 14. Electrical device 22 may be releasably attached to insert 14 by means of screws 25. Electrical device 22 may be electrically connected to incoming wire cable 28 or outgoing wire cable 30 by introducing incoming wire cable 28 or outgoing wire cable 30 through the back of outer casing 12 and appropriately attaching one of the wires found, in incoming wire cable 28 or outgoing wire cable 30 to a port 36 found on the back of the back panel of insert 14 and then appropriately attaching rods 21 to a port 36 found on the front of the back panel of insert 14. Rods 21 are permanently attached to electrical device 22 along the sides of electrical device 22. Additionally, rods 21 are aligned with ports 36 so that electrical device 22 may be simply embedded into insert 14 without requiring the installer to manually insert device wiring 23 into port 36 as shown in FIG. 1A. Other attributes and features of electrical box assembly 10 will be disclosed in the following figures.

Figure 1D:
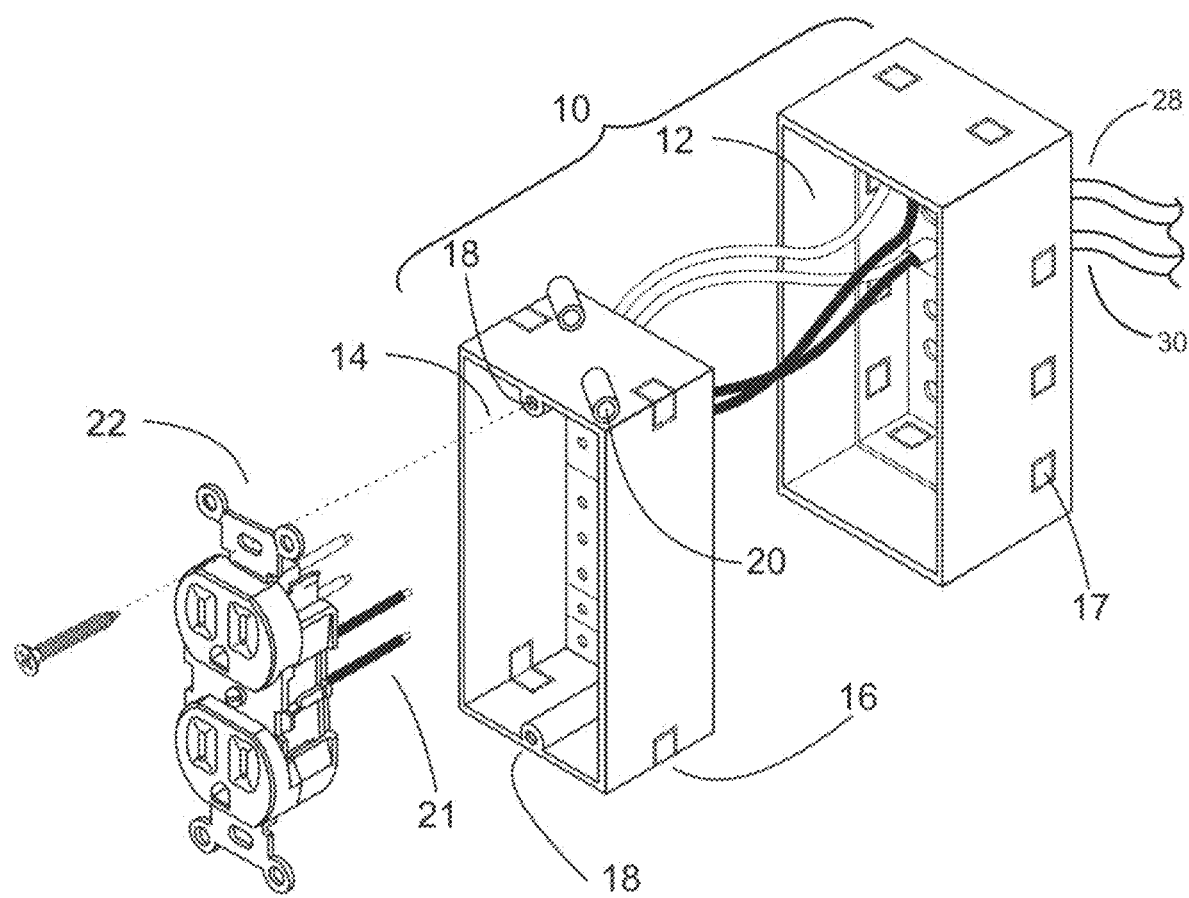
FIG. 1D shows an exploded view of the fourth embodiment of the electrical box assembly and an electrical device.

Referring now to FIG. 1D, the reader is presented with an exploded view of the fourth embodiment of electrical box assembly 10 along with electrical device 22 which in FIG. 1D is an outlet. Electrical box assembly 10 consists of outer casing 12 and insert 14. Outer casing 12 is rectangular and enclosed along its back and side planes. There is no front plane so as to expose the hollow interior of outer casing 12. The back of outer casing 12 is configured with one or more openings 32 as shown in FIG. 1D and FIG. 2. Openings 32 may differ so as to accommodate varying cable types. It will be understood that the number and orientations of openings 32 and their configurations are merely exemplary and other numbers, orientations, and configurations may be used. For example, openings 32 may be circular or square. In addition, openings 32 may be similar to casing punch-out access plates 17 so that only a subset of openings 32 need to be opened. Casing punch-out access plates 17 allows the user to insert into outer casing 12 a wire cable, similar to incoming wire cable 28 or outgoing wire cable 30, if it is not possible to insert the wire cable through the back of outer casing 12. It will be understood to someone with ordinary skill in the art that the arrangement of casing punch-out access plates 17 may vary in regards to position, size, orientation, number, and method of construction from what is shown. Insert 14 is structurally similar to outer casing 12 in that it also is rectangular and enclosed along its back and side planes. There is no front plane so as to expose the hollow interior of insert 14. Insert 14 is sized along each dimension so as to be slightly smaller than outer casing 12 so that insert 14 may be partially inserted into outer casing 12. Insert 14 may also be fabricated with one or more insert punch-out access plates 16 of which four are visible in FIG. 1D. Insert punch-out access plates 16 are shown being fabricated on insert 14 via a small plastic tab that may be easily broken by the application of force or the use of a box cutter knife. It is understood that insert punch-out access plates 16 may also be formed by other means during fabrication. The purpose of insert punch-out access plates 16 is to provide the user of electrical box assembly 10 a means of connecting incoming wire cable 28 or outgoing wire cable 30 to electrical device 22 without using one of the many ports 36 found on the back plane of insert 14. It will be understood that the number and orientations of insert punch-out access plates 16 and their configurations are merely exemplary and other numbers, orientations, and configurations may be used. Also, it will be understood to one with ordinary skill in the art that many possible means may be considered to secure a wire to a particular port 36. Insert 14 also comprises a retaining clip 20 to mount insert 14 to a framing member of the commercial or residential building. Typically, insert 14 is secured to a framing member by driving a nail through retaining clip 20 and into the framing member. Outer casing 12 also may include retaining clip 20 to mount outer casing 12 to a framing member of the commercial or residential building. The framing member is not shown in FIG. 1D. Finally, insert 14 is also provided with mounting points 18, one mounting point 18 at the top of the front of insert 14, and a second mounting point 18 at the bottom of the front of insert 14. Electrical device 22 may be releasably attached to insert 14 by means of screws 25. Electrical device 22 may be electrically connected to incoming wire cable 28 or outgoing wire cable 30 by introducing incoming wire cable 28 or outgoing wire cable 30 through the back of outer casing 12 and appropriately attaching one of the wires found in incoming wire cable 28 or outgoing wire cable 30 to a port 36 found on the back of the back panel of insert 14 and then appropriately attaching rods 21 to a port 36 found on the front of the back panel of insert 14. Rods 21 are permanently attached to electrical device 22 along the back of electrical device 22. Additionally, rods 21 are aligned with ports 36 so that electrical device 22 may be simply embedded into insert 14 without requiring the installer to manually insert fixture wiring 23 into port 36 as shown in FIG. 1A. Other attributes and features of electrical box assembly 10 will be disclosed in the following figures.

Figure 1E:
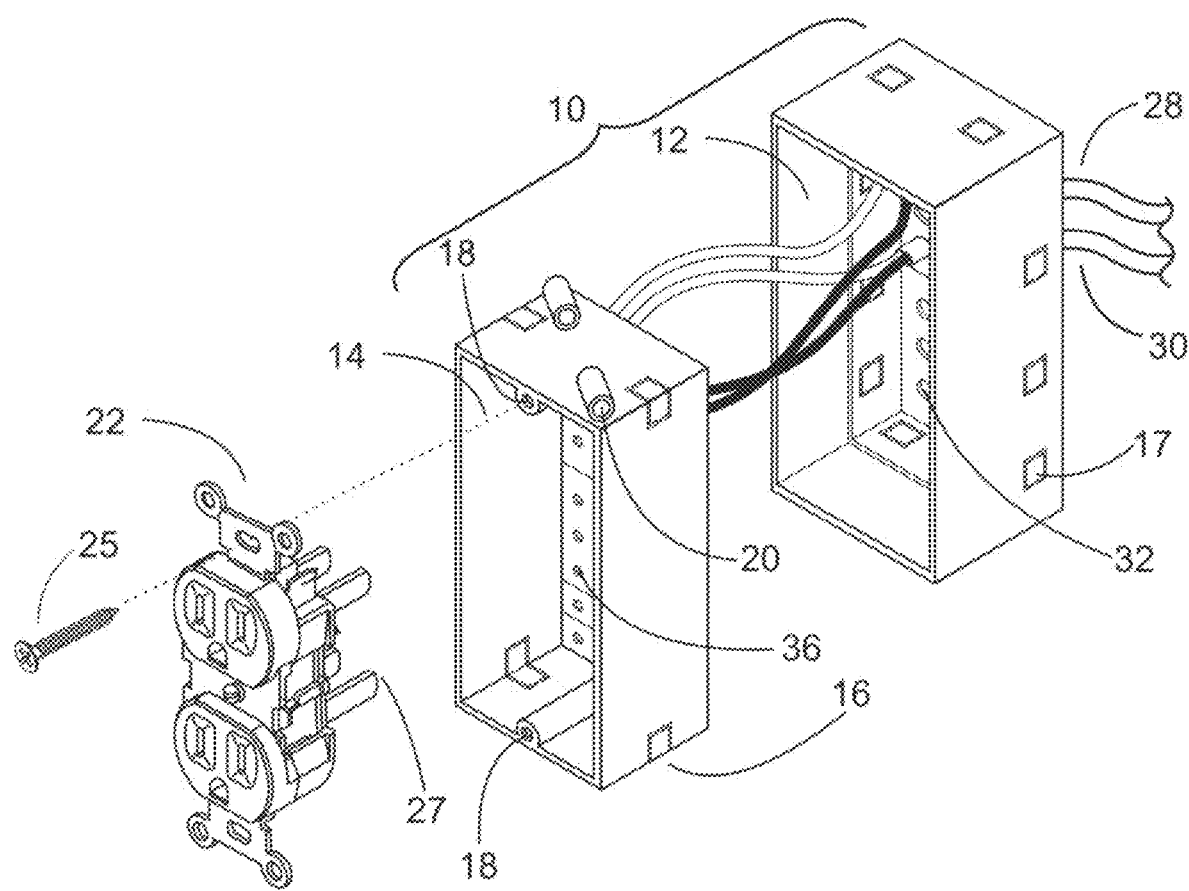
FIG. 1E shows an exploded view of the fifth embodiment of the electrical box assembly and an electrical device.

Referring now to FIG. 1E, the reader is presented with an exploded view of the fifth embodiment of electrical box assembly 10 along with electrical device 22 which in FIG. 1E is an outlet. Electrical box assembly 10 consists of outer casing 12 and insert 14. Outer casing 12 is rectangular and enclosed along its back and side planes. There is no front plane so as to expose the hollow interior of outer casing 12. The back of outer casing 12 is configured with one or more openings 32 as shown in FIG. 1E and FIG. 2. Openings 32 may differ so as to accommodate varying cable types. It will be understood that the number and orientations of openings 32 and their configurations are merely exemplary and other numbers, orientations, and configurations may be used. For example, openings 32 may be circular or square. In addition, openings 32 may be similar to casing punch-out access plates 17 so that only a subset of openings 32 need to be opened. Casing punch-out access plates 17 allows the user to insert into outer casing 12 a wire cable, similar to incoming wire cable 28 or outgoing wire cable 30, if it is not possible to insert the wire cable through the back of outer casing 12. It will be understood to someone with ordinary skill in the art that the arrangement of casing punch-out access plates 17 may vary in regards to position, size, orientation, number, and method of construction from what is shown. Insert 14 is structurally similar outer casing 12 in that it also is rectangular and enclosed along its back and side planes. There is no front plane so as to expose the hollow interior of insert 14. Insert 14 is sized along each dimension so as to be slightly smaller than outer casing 12 so that insert 14 may be partially inserted into outer casing 12. Insert 14 may also be fabricated with one or more insert punch-out access plates 16 of which four are visible in FIG. 1E. Insert punch-out access plates 16 are shown being fabricated on insert 14 via a small plastic tab that may be easily broken by the application of force or the use of a box cutter knife. It is understood that insert punch-out access plates 16 may also be formed by other means during fabrication. The purpose of insert punch-out access plates 16 is to provide the user of electrical box assembly 10 a means of connecting incoming wire cable 28 or outgoing wire cable 30 to electrical device 22 without using one of the many ports 36 found on the back plane of insert 14. It will be understood that the number and orientations of insert punch-out access plates 16 and their configurations are merely exemplary and other numbers, orientations, and configurations may be used. Also, it will be understood to one with ordinary skill in the art that many possible means may be considered to secure a wire to a particular port 36. Insert 14 also comprises a retaining clip 20 to mount insert 14 to a framing member of the commercial or residential building. Typically, insert 14 is secured to a framing member by driving a nail through retaining clip 20 and into the framing member. Outer casing 12 also may include retaining clip 20 to mount outer casing 12 to a framing member of the commercial or residential building. The framing member is not shown in FIG. 1E. Finally, insert 14 is also provided with mounting points 18, one mounting point 18 at the top of the front of insert 14, and a second mounting point 18 at the bottom of the front of insert 14. Electrical device 22 may be releasably attached to insert 14 by means of screws 25. Electrical device 22 may be electrically connected to incoming wire cable 28 or outgoing wire cable 30 by introducing incoming wire cable 28 or outgoing wire cable 30 through the back of outer casing 12 and appropriately attaching one of the wires found in incoming wire cable 28 or outgoing wire cable 30 to a port 36 found on the back of the back panel of insert 14 and then appropriately attaching tabs 27 to ports 36 configured to receive tabs 27. Ports 36 that are configured to receive tabs 27 have a different configuration than ports 36 that are configured to receive a wire. Tabs 27 are permanently or removably attached to electrical device 22 along the back of electrical device 22. Additionally, tabs 27 are aligned with ports 36 configured to receive tabs 27 so that electrical device 22 may be simply embedded into insert 14 without requiring the installer to manually insert fixture wiring 23 into port 36 as shown in FIG. 1A. Other attributes and features of electrical box assembly 10 will be disclosed in the following figures.

Referring now to FIG. 2, the reader is presented with a view similar to FIG. 1A through FIG. 1E but with insert 14 turned 90 degrees in order to expose the back of insert 14. Here it may be seen that the back of insert 14 contains a number of ports 36 organized as a matrix with the entire matrix further grouped into smaller submatrices. Each submatrix contains one or more ports 36 that are electrically connected together so that inserting a wire into one port 36 of a submatrix will electrically connect the wire to any other wire that is inserted into a port 36 of that same submatrix. The back of insert 14 is shown with six submatrices; the six submatrices shown in FIG. 2 are identified as white (twice), black (twice), 3-wire, and ground. When in use, incoming wire cables 28 or outgoing wire cables 30, may be passed through one of the openings 32 found in outer casing 12. Individual wires contained in incoming wire cables 28 or outgoing wire cables 30, after their ends have been stripped of any insulating material, may then be inserted into a port 36. Wires belonging to incoming wire cables 28 or outgoing wire cables 30 with similar electrical function are inserted into ports 36 belonging to the same submatrix. As such, white wires will all be plugged into a port 36 belonging to the submatrix labeled WHITE. Black wires will all be plugged into a port 36 belonging to the submatrix labeled BLACK. 3-wire wires will all be plugged into a port 36 belonging to the submatrix labeled 3-WIRE. Finally, green wires will all be plugged into a port 36 belonging to the submatrix labeled GROUND. It will be understood that the number and orientations of submatrix and their configurations are merely exemplary and other numbers, orientations, and configurations may be used. On the side opposite the backside of insert 14, a similar arrangement of ports 36 is present to allow wires from electrical device 22 to be connected to a submatrix with common electrical functionality. This is shown in FIG. 1A through FIG. 1D where the four wires from electrical device 22, two black and two white, are inserted into appropriate ports on the front face of the back of insert 14 to establish electrical connections with white and black wires contained within incoming wire cable 28 and outgoing wire cable 30. Also shown in FIG. 2 is bump 24 on outer casing 12 that is designed to enter into recess 26 on insert 14. As insert 14 is positioned into outer casing 12, insert 14 is positioned far enough into outer casing 12 such that bump 24 enters into recess 26. This mating of bump 24 and recess 26 allows insert 14 to be releasably engaged with outer casing 12.

Figure 3A:
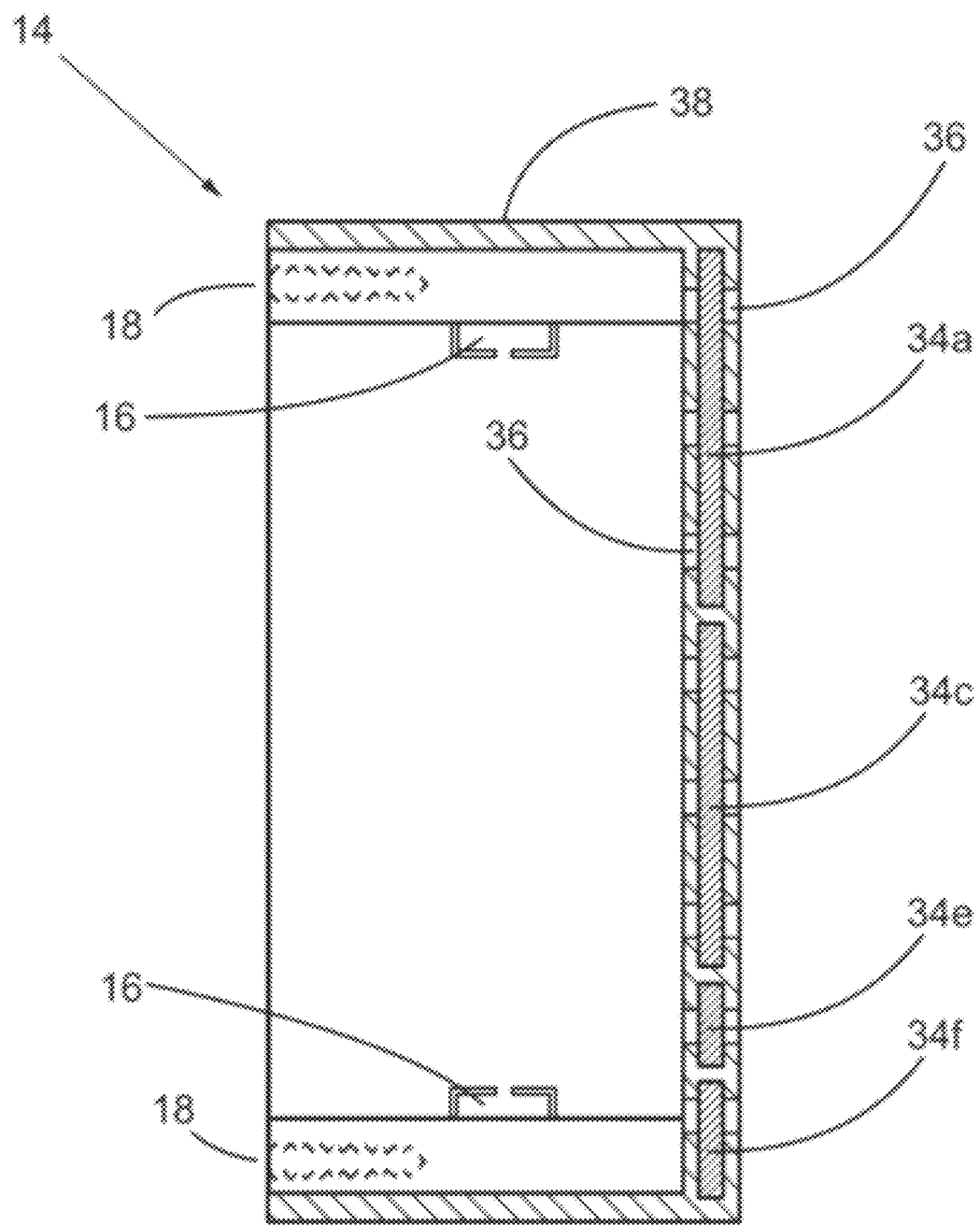
FIG. 3A shows a cross-section of the first embodiment of the insert at the plane identified by A.

FIG. 3A shows the first embodiment of insert 14 at plane A. Plane A is identified in FIG. 2 and FIG. 4. Insert 14 comprises a dielectric shell 38 generally made of plastic. On both sides of the back of insert 14 may be found ports 36. Ports 36 are on both sides of the back of insert 14 in order to provide an electrical connection from wires coming from electrical device 22 to wires coming from incoming wire cable 28 and outgoing wire cable 30. Also shown are conducting panel 34a, conducting panel 34c, conducting panel 34e, and conducting panel 34f. Conducting panel 34a electrically connects all of the ports 36 found in the submatrix labeled BLACK in the upper left corner of insert 14 as shown in FIG. 2. Conducting panel 34c electrically connects all of the ports 36 found in the submatrix labeled BLACK in the mid-left side of insert 14 as shown in FIG. 2. Conducting panel 34e electrically connects all of the ports 36 found in the submatrix labeled 3-WIRE in the lower portion of insert 14 as shown in FIG. 2. Conducting panel 34f electrically connects all of the ports 36 found in the submatrix labeled GROUND in the lower portion of insert 14 as shown in FIG. 2. Plugging a wire into a port associated with one conducting panel will cause that wire to be in electrical connection with any other wire plugged into a port associated with that same conducting panel. One skilled in the art will understand that there are a number of mechanical means to secure a wire in a port.

Figure 3B:
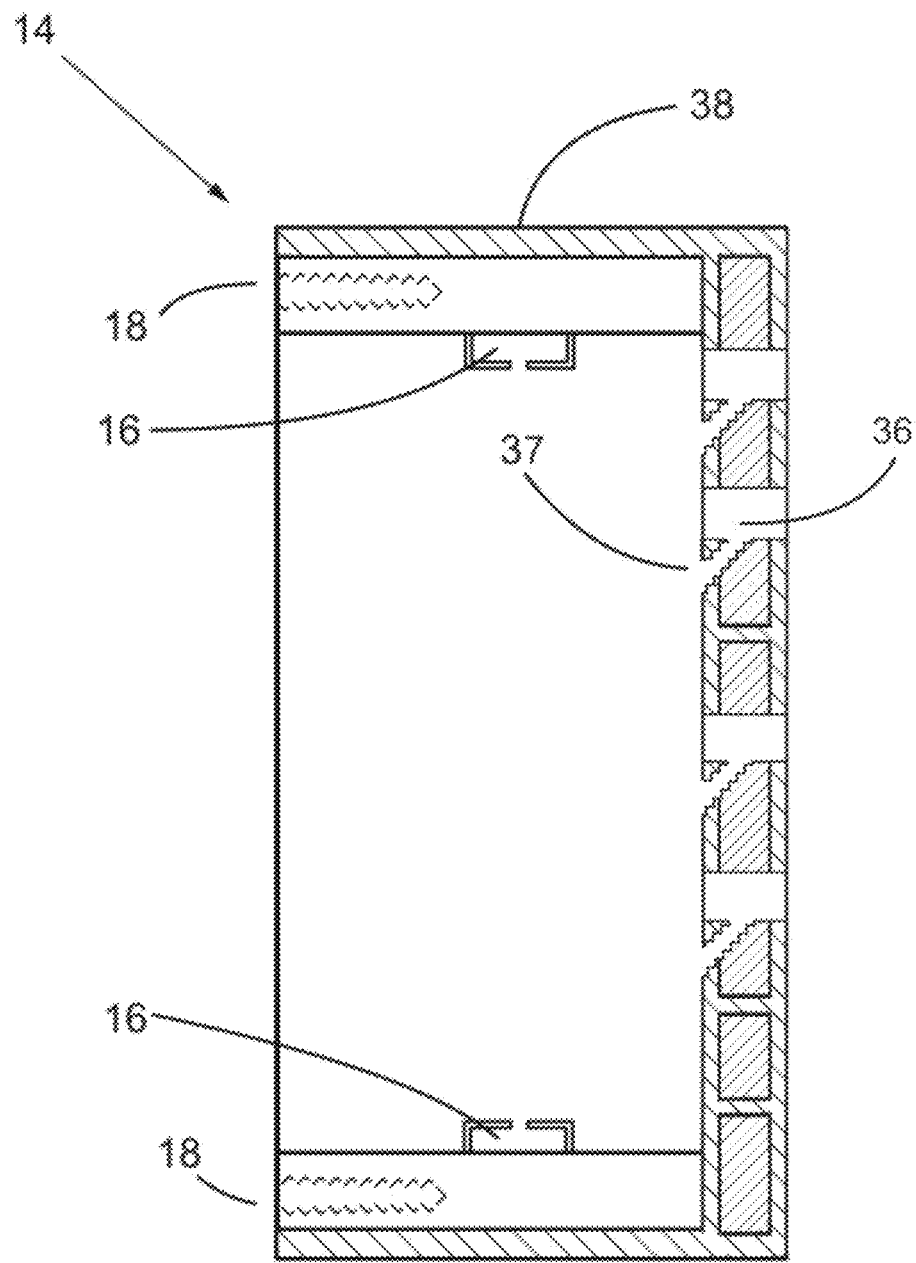
FIG. 3B shows a cross-section of the second embodiment of the insert at the plane identified by A.

FIG. 3B shows the second embodiment of insert 14 at plane A. Plane A is identified in FIG. 2 and FIG. 4. Insert 14 comprises a dielectric shell 38 generally made of plastic. On both sides of the back of insert 14 may be found ports 36 that provide a passage from the front of insert 14 back panel to the back of insert 14 back panel. In other words, wires inserted into port 36 may pass completely through the back panel of insert 14. Also found in the back panel of insert 14 are threaded shafts 37 that allow a screw with mating threads to make electrical contact with conducting panel 34 and when threaded far enough will enter port 36 to clamp the wire within port 36. Thus a wire, having a tip that is stripped of its insulating material and is inserted into port 36, may be secured within port 36 by a screw passing through threaded shaft 37 and additionally, make electrical contact with conducting panel 34 that surrounds both port 36 and threaded shaft 37. One skilled in the art will understand that there other mechanical means to secure a wire in a port 36 besides what is described in FIG. 3B.

Figure 4:
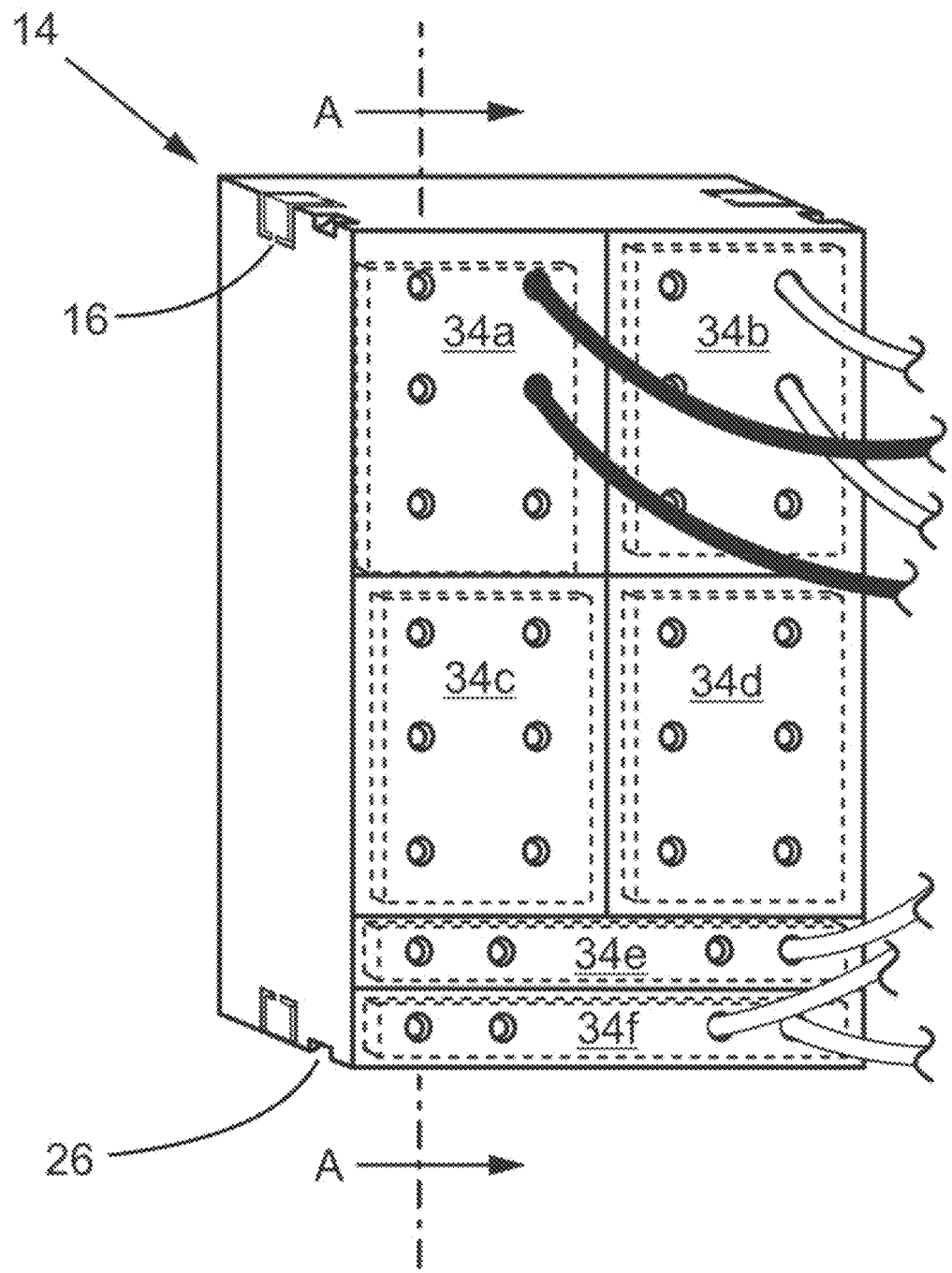
FIG. 4 shows a perspective view of the insert with the internal panels identified by dashed lines.

FIG. 4 shows insert 14 as shown in FIG. 2 with the electrical wires connecting insert 14 to incoming wire cable 28 and outgoing wire cable 30 being terminated. Shown in dashed lines are the submatrices, also described as conducting panels 34 in this disclosure, as discussed in FIGS. 2, 3A, and 3B. The submatrices are contained within dielectric shell 38 as shown in FIG. 3A and FIG. 3B. It will be understood that the number and orientations of the conducting panels 34 and their configurations are merely exemplary and other numbers, orientations, and configurations may be used. In FIG. 4 six conducting panels are shown: 34*a*, 34*b*, 34*c*, 34*d*, 34*e*, and 34*f*. Each conducting panel 34 electrically connects all wiring inserted into one of the ports 36 covered by condo panel 34 regardless of whether the wiring is inserted into a port found on the back of insert 14 or found on the side opposite the back of insert 14.

Although the described embodiments of the present invention are believed to represent the best mode of the present invention, it should be understood that many described components of the present invention have known functional equivalents. Additionally, orientations, proportions, and shapes used within the description may be modified by a person skilled in the art. More particularly, although the present invention shows a simple square wiring box, many other configurations can be used and the invention so practiced. All such modifications and deviations are intended to be covered by the scope of the invention.

What is claimed is:

1. An electrical box assembly comprising:
    an outer casing having a back panel containing one or more openings and one or more side panels encompassing and perpendicular to the back panel so as to form a hollow container with an open face; and
    an insert having a back panel and one or more side panels encompassing and perpendicular to the insert's back panel so as to form a hollow container with an open face that is insertable into the outer casing, the insert's back panel further comprising:
        a plurality of conductive panels wherein each conductive panel is within the insert's back panel front and rear walls;
            has a plurality of front ports on the insert's back panel front wall in electrical communication with the conductive panel; and
            has a plurality of back ports on the insert's back panel in electrical communication with the conductive panel.

2. The electrical box assembly of claim 1 wherein the openings in the back panel of the outer casing are covered by tabs that may be opened by application of pressure or with an appropriate cutting blade.

3. The electrical box assembly of claim 1 wherein the side panels encompassing and perpendicular to the back panel of the outer casing has one or more openings that are covered by tabs that may be opened by application of pressure or with an appropriate cutting blade.

4. The electrical box assembly of claim 1 wherein the walls of the side panels encompassing and perpendicular to the back panel of the outer casing are thicker where the edge of the side panel meets the edge of the back panel and thinner at the opposite edge.

5. The electrical box assembly of claim 1 wherein the side panels encompassing and perpendicular to the back panel of the outer casing has one or more retaining clips to secure the outer casing to a framing member of a commercial or residential building.

6. The electrical box assembly of claim 1 wherein the side panels of the insert includes a recess to mate with a corresponding bump found on the side panels of the outer casing.

7. The electrical box assembly of claim 1 wherein the side panels encompassing and perpendicular to the back panel of the insert has one or more retaining clips to secure the insert to a framing member of a commercial or residential building.

8. The electrical box assembly of claim 1 further comprising:
    an electrical device positioned within the insert;
    a plurality of first electrical conductors passing through the outer casing's openings and into one or more of the back ports making electrical contact with one or more of the conductive panels; and
    a plurality of second electrical conductors connecting the electrical device to one or more of the conductive panels through one or more of the front ports.

9. The electrical box assembly of claim 8 wherein the one or more front ports of the insert's back panel, has a corresponding threaded shaft that allows a screw to enter through one of the conductive panels and clamp one of the first electrical conductors or one of the second electrical conductors within a port to ensure an electrical connection between one of the first electrical conductors or one of the second electrical conductors and the conductive panel.

10. The electrical box assembly of claim 8 wherein the insert further comprises mounting holes to secure the electrical device to the insert with one or more screws.

11. The electrical box assembly of claim 8 wherein the second electrical conductors are conductive wires.

12. The electrical box assembly of claim 8 wherein the second electrical conductors are conductive rods that are removably attached to the electrical device.

13. The electrical box assembly of claim 8 wherein the second electrical conductors are conductive rods that are permanently attached to the electrical device.

14. The electrical box assembly of claim 8 wherein the second electrical conductors are conductive tabs that are removably attached to the electrical device.

15. The electrical box assembly of claim 8 wherein the second electrical conductors are conductive tabs that are permanently attached to the electrical device.

16. An electrical box assembly comprising:
    an outer casing having a back panel containing one or more openings and one or more side panels encompassing and perpendicular to the back panel so as to form a hollow container;
    an insert having a back panel and one or more side panels encompassing and perpendicular to the insert's back panel so as to form a hollow container that is insertable into the outer casing, the insert's back panel further comprising:
        a plurality of conductive panels wherein each conductive panel is within the insert's back panel front and rear walls;
            has a plurality of front ports on the insert's back panel front wall each in electrical communication with the conductive panel;

has a plurality of back ports on the insert's back panel rear wall each in electrical communication with the conductive panel; and front ports and back ports comprise a threaded shaft comprising a portion of the dielectric and a portion of the conductive panel sandwiched between the portions of the dielectric, the threaded shaft configured to receive a screw;

an electrical device positioned within the insert;

a plurality of first electrical conductors passing through the outer casing's openings and into one or more of the back ports making electrical contact with one or more of the conductive panels; and a plurality of second electrical conductors connecting the electrical device to one or more of the conductive panels through one or more of the front ports.

* * * * *